E. Sirret.
Revolving Rake.

Nº 12169.  Patented Jan 2, 1855.

UNITED STATES PATENT OFFICE.

EMILE SIRRET, OF BUFFALO, NEW YORK.

IMPROVEMENT IN RAKES.

Specification forming part of Letters Patent No. 12,169, dated January 2, 1855.

*To all whom it may concern:*

Be it known that I, EMILE SIRRET, of Buffalo, in the county of Erie and State of New York, have invented a new and useful Improvement in Horse-Rakes for Raking Hay; and I do hereby declare that the following is a full, clear, and exact description of the same, reference being had to the accompanying drawings, forming part of this specification, in which—

Figure 1:
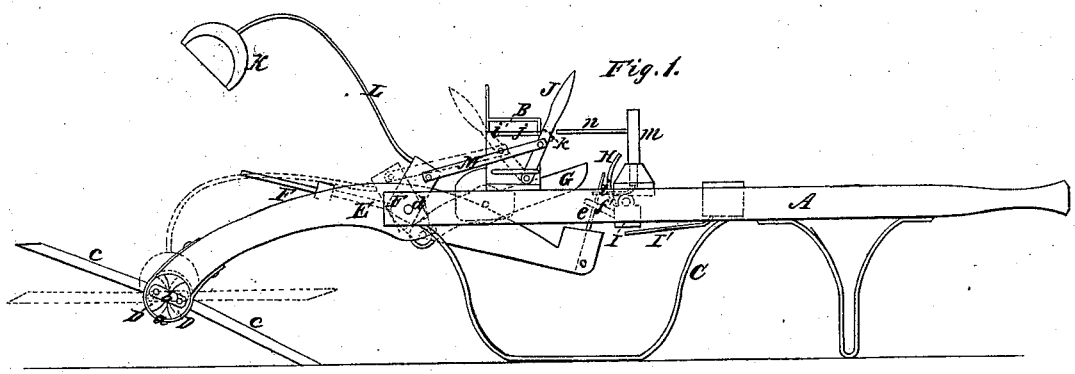
Figure 2:
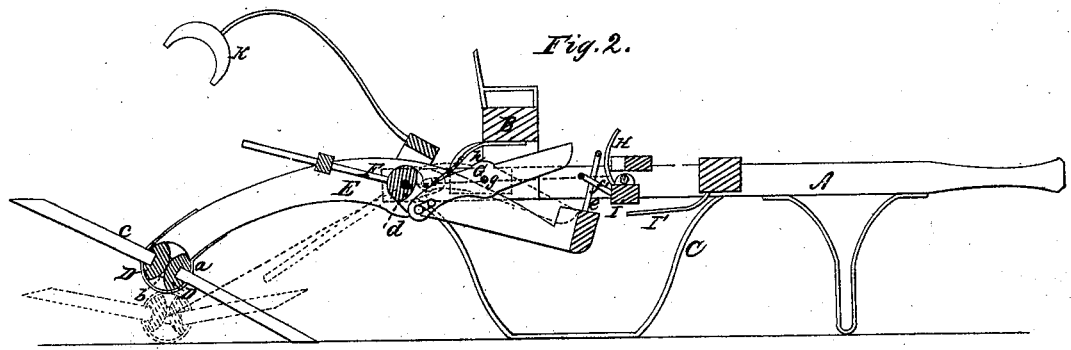
Figure 3:
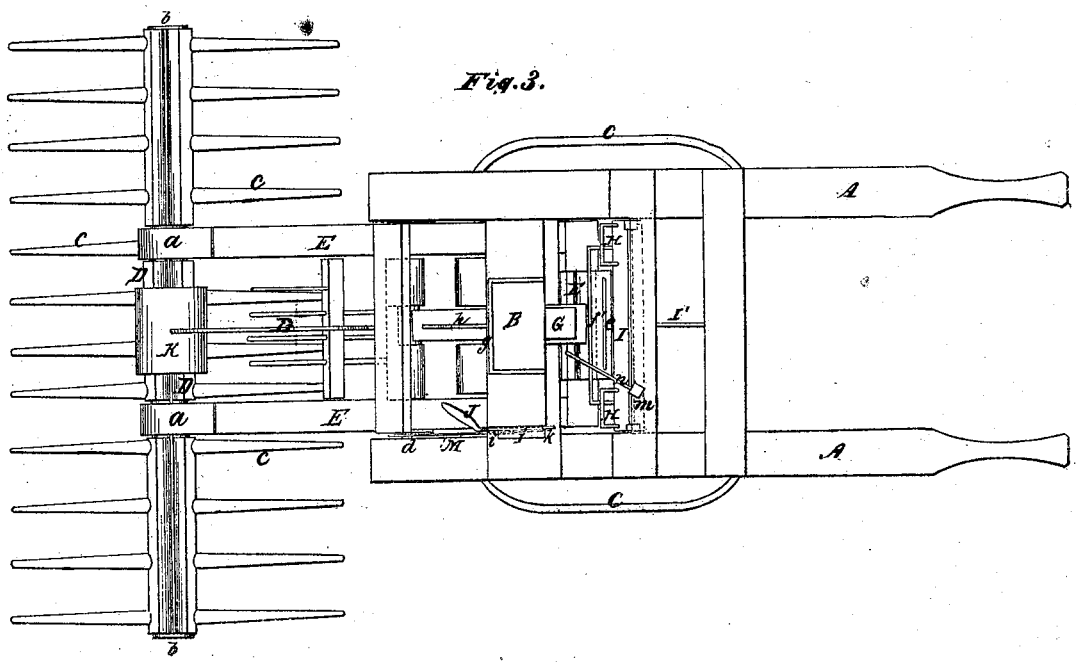

Figure 1 is a side elevation of a hay-rake with my improvements, it being shown as in operation. The red lines show the position of the "rake-stop" when the machine is not in operation. Fig. 2 is a longitudinal section of the same, the points of the teeth of the rake being shown depressed, as when raking, in black lines, and elevated, as when passing over hills, in red lines. The discharging-lever is also shown by red lines in the proper position for causing the rake to revolve and the hay to be discharged. Fig. 3 is a plan or top view of the same.

Similar letters of reference in each of the several figures indicate corresponding parts.

This invention relates to certain new and useful improvements in the revolving horse-rake for raking hay, whereby it is considerably simplified in its construction, made capable of accommodating itself to the undulating surface of the land, and susceptible of being operated with ease and facility by the feet of the driver when it is desired to have the rake revolve from under and dump the hay collected on it.

The nature of the first part of said improvement consists in making the rake-head in two sections and uniting said sections together near the center of their length by collars on the ends of a vibrating frame or treadle, and at their ends by thin plates in such a manner that either one or both of them can be caused, by the action of the treadle to which they are attached, to turn a short distance, and thereby throw the rake-teeth up or down as occasion may require. It is by this arrangement that the rake is rendered capable of molding or accommodating itself to the undulations of the land, and all danger of stoppage and breakage from its teeth running against hills, &c., avoided.

It consists, second, in combining with the above a jointed forked treadle for effecting, through the action of the driver's feet, the discharge of the hay when the teeth are depressed by the vibrating treadle which carries the rake-head.

To enable others skilled in the art to make and use my invention, I will proceed to describe its construction and operation.

A A represent the shafts to which the horse is attached. They extend back some distance, and serve as a support for the rake and the mechanism for operating the same, and also the driver's seat B.

C C are runners for the shafts to rest upon. They are employed instead of wheels.

D D are the two sections of the rake-head. They are made of nearly-elliptical shape, and arranged together in the manner represented, and held thus, near the center of their length, by the collars *a a* on the curved ends of the vibrating frame or treadle E, and at their ends by the thin plates *b b*. Either of the sections D D has perfect freedom to move up and down a short distance, and consequently the teeth C, which form the rake and are secured in the head D D, are capable of changing their position when the head is operated by the frame or treadle E, and when passing over a hill or undulations of the land. In Fig. 2 in red lines the manner in which the rake-head is depressed and the points of the teeth elevated while passing over hilly land is clearly illustrated, the points of the teeth being caused to assume the position shown through the resistance offered by the hay. The frame or treadle E is hung on the fulcrum *d*, which passes entirely through the frame, and serves also as a fulcrum for the forked portion F of the jointed treadle G to turn upon, as shown in the drawings. The front end of the frame or treadle E extends forward a short distance in front of the seat B, so that the feet of the driver may readily be brought to act upon it when it is necessary to throw the rake in operation. *e* is a bracket secured in the top of the front end of the frame or treadle E for the foot or feet of the driver to pass under when it is desired to lift the front and depress the back end of the said frame or treadle, as shown in red in Fig. 2. This frame or treadle is capable of adjusting itself as soon as the feet are taken off of it, owing to the rake being attached to its rear end, and the distance from the fulcrum to said rear end being longer than that to the front end.

H H are two smaller treadles, secured in a transverse vibrating bar, I, which is made capable of always assuming its common position after the feet are withdrawn from the treadles by means of a spring, I'. These treadles are connected with the treadle E by a bracket, $f'$, as shown, and by placing or pressing the feet down on them the frame or treadle E can be elevated sufficiently to cause the rake, by its own gravity, to turn to a proper position for collecting the hay, as shown in black in Fig. 1.

The jointed self-adjusting forked treadle F G turns on fulcra $d\ g$, as shown, and serves for discharging the hay as fast as the rake collects a bundle. Its front end is under the control of the driver's feet, and by depressing said end the back forked end, F, will be depressed to the position shown in dotted red lines in Fig. 2, and caused to bear upon the hay collected and hold it down to the ground until the rake-teeth revolve from under it, which will occur instantly after the driver applies one of his feet to the treadle F G and the other to the treadle E, the weight of the hay and the power applied to the treadles causing the teeth of the rake to take into the ground, and the forward motion of the horse, with the resistance offered by reason of the teeth passing into the soil, causing the rake-head to revolve and the lower set of teeth to revolve backward from under the hay and allow it to fall to the ground in a bundle. As soon as the hay is discharged the treadle F G and the rake are caused to assume their common position, ready for another operation, by a spring, $h$.

J K L M, Figs. 1, 2, and 3, represent the device for locking the rake-head and preventing it turning while transporting the machine to and from the meadow. The spring-lever J, by which the semicircular piece K, through the connecting-links L M, is moved in contact with the rake-head, is held in place after the rake-head is locked by being placed in the notch $i$ of the plate $j$ on the side of the seat B, as represented in red lines. When the rake-head is unlocked the lever occupies the position shown in black in Fig. 1 and fits to the notch $k$ of the plate $j$. The front end of the treadle is prevented from being caused to descend as the rake is moved to and from the meadow by the stop $l$, which is secured in the lower end of the standard $m$, and turns with it as it is turned by the arm $n$.

By arranging all the parts, with the exception of the device for locking the rake-head, so as to have them under the control of the driver's feet the driver has full use of his hands to manage his horse.

I am aware that the treadle E is not new, and therefore I make no claim to it; but What I do claim as my invention, and desire to secure by Letters Patent, is—

1. A revolving rake having the head made in two sections, and arranged and operating essentially as herein described.

2. In combination with the same, the employment and arrangement of the jointed forked treadle F G, substantially as and for the purpose set forth.

EMILE SIRRET.

Witnesses:
H. B. BURT,
W. W. MASON.